Dec. 16, 1969 M. A. GUETTEL 3,484,620

SOLID STATE CONTROL CIRCUIT FOR A RESISTANCE WELDER

Filed Feb. 17, 1967 2 Sheets-Sheet 1

INVENTOR.
MARVIN A. GUETTEL
BY
William H. Schmeling

SOLID STATE CONTROL CIRCUIT FOR A RESISTANCE WELDER

Filed Feb. 17, 1967 2 Sheets-Sheet 2

INVENTOR.
MARVIN A. GUETTEL
BY 3,484,620
SOLID STATE CONTROL CIRCUIT FOR A RESISTANCE WELDER

Marvin A. Guettel, Milwaukee, Wis., assignor to Square D Company, Park Ridge, Ill., a corporation of Michigan Filed Feb. 17, 1967, Ser. No. 616,884
Int. Cl. H01h *43/24*
U.S. Cl. 307—141 10 Claims

ABSTRACT OF THE DISCLOSURE

A control circuit for a resistance welder having a decoding transistor circuit which has inputs connected to receive output signals from each of a plurality of flip-flops in a ring counter to program the circuit to time a Squeeze period when the flip-flops of the counter are initially switched to not time the Weld, Hold and Off periods and to time the duration of each period with a circuit including a capacitor that is charged by signals from each of the flip-flops and the decoding circuit to supply signals for sequentially switching the flip-flops in synchronism with the reversals in polarity of an alternating voltage supply and to use the signals from one of the flip-flops to control the operation of a circuit having additional flip-flops providing signals for controlling the initiation and intensity of welding current flow.

Figure 1:
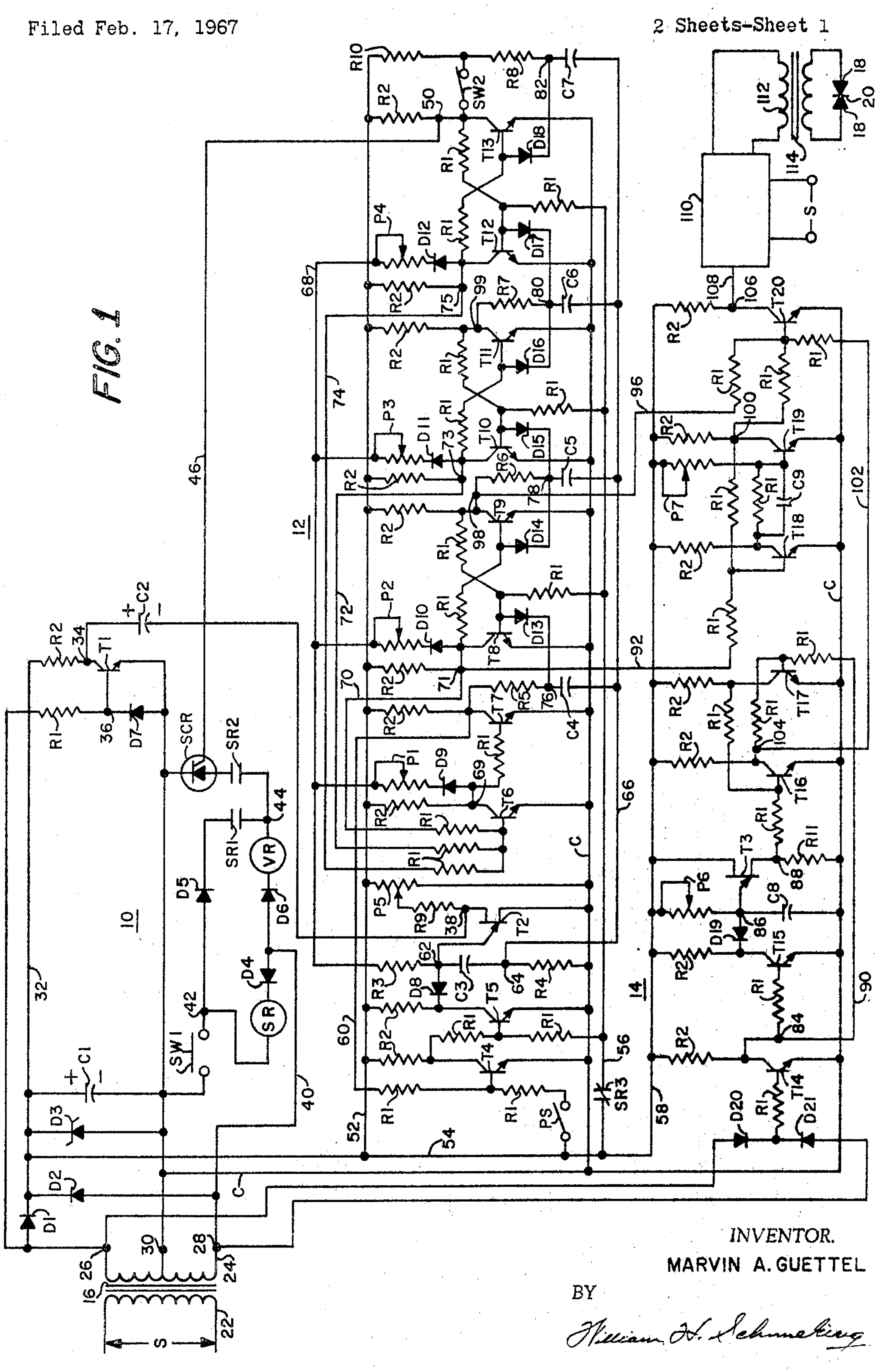

The present invention relates to control circuit for resistance welders and is more particularly concerned with a control circuit having a ring counter and a single timing capacitor for controlling the sequence and duration of each of a plurality of periods of operation of a resistance welding apparatus and a circuit including flip-flops which are synchronously switched with reversals in polarity of an alternating voltage source to control the initiation and intensity of welding current flow.

Conventional resistance welder controllers usually are required to sequence and control a plurality of operations having respective time periods as follows: a Squeeze-time period, during which the welder electrodes are moved into engagement with the parts to be welded; a Weld-time period, during which welding current is caused to flow for welding the parts together; a Hold-time period, during which the electrodes are held in engagement with the work to permit the welded metal of the parts to cool; and, an Off-time period, during which the welder electrodes separate so they may be repositioned to form another weld.

The use of solid-state circuits to control the sequence and duration of a plurality of operations of a resistance welding apparatus is well known and an example of a circuit which has been successfully used is illustrated by a U.S. Patent 3,267,303, issued Aug. 16, 1966, filed May 1, 1963, which has been assigned by the inventors Charles F. Meyer and James J. Eckl to the assignee of the present invention. In the Meyer et al. patent, a binary coded decimal counter is used to control the charging of a single capacitor through a decoding network that required a large number of diodes to decode the output signals of the counter. In the circuit according to the present invention a ring counter is used and thereby the elaborate decoding network as used in the Meyer et al. patent is eliminated, and, as the decoding circuit controls the charging path for the capacitor during one of the operational periods of the welding apparatus, one flip-flop in the ring counter is eliminated. In the circuit as disclosed in the Meyer et al. patent an arrangement for accomplishing lead-trail, delayed firing, and heat control of the welding current is also disclosed. In the circuit as herein described, these functions are accomplished by a novel, inexpensive circuit having less components to accomplish the same functions as achieved by the Meyer et al. circuit.

It is an object of the present invention to control the sequence and the duration of a plurality of operations of a resistance welding apparatus with a control circuit having a ring counter and a decoding circuit that operates to provide a charging potential for a timing capacitor when the ring counter is providing signals to the decoding circuit indicating the counter is not in a state to time one of the operations.

A further object is to provide a simplified circuit for controlling the operations of a resistance welding apparatus having a minimum number of solid state components including a ring counter that has one less pair of bistable flip-flops than the number of operations to be sequenced and timed by the circuit, a decoding circuit arranged to control the charging of a timing capacitor when the flip-flops in the ring counter are not controlling the operation of the welding apparatus and a circuit including flip-flops for controlling the initiation and intensity of welding current flow when one of the flip-flops in the ring counter is switched to a selected one of its bistable states.

An additional object of the present invention is to control the sequence and duration of a plurality of operations of a resistance welding apparatus with a control circuit having a plurality of bistable state flip-flops interconnected as a ring counter, a decoding circuit having inputs arranged to detect the bistable state of each of the flip-flops and supply an output signal when all of the flip-flops are not in a preselected state, a single timing capacitor having a plurality of individual charging circuits controlled by the flip-flops and the decoding circuit, a means responsive to the charge on the capacitor for supplying an output signal in synchronism with reversals in polarity of an alternating voltage source for the system and for sequentially switching the flip-flops, a circuit for delaying initiation of welding current flow after one of the flip-flops in the ring counter is switched to a selected one of its bistable states and for controlling the intensity of welding current flow after the welding current flow is initiated and an electronic switch having a control electrode arranged to receive an output signal from another flip-flop in the ring counter during one less than all of said periods of operation of the welding apparatus for controlling the energization of a relay that controls the operation of a pair of welding electrodes.

Further objects and features of the invention will be readily apparent to those skilled in the art from the specification and appended drawing illustrating certain preferred embodiments in which:

FIG. 1 schematically shows a solid state circuit for a resistance welding apparatus according to the present invention.

Figure 2:
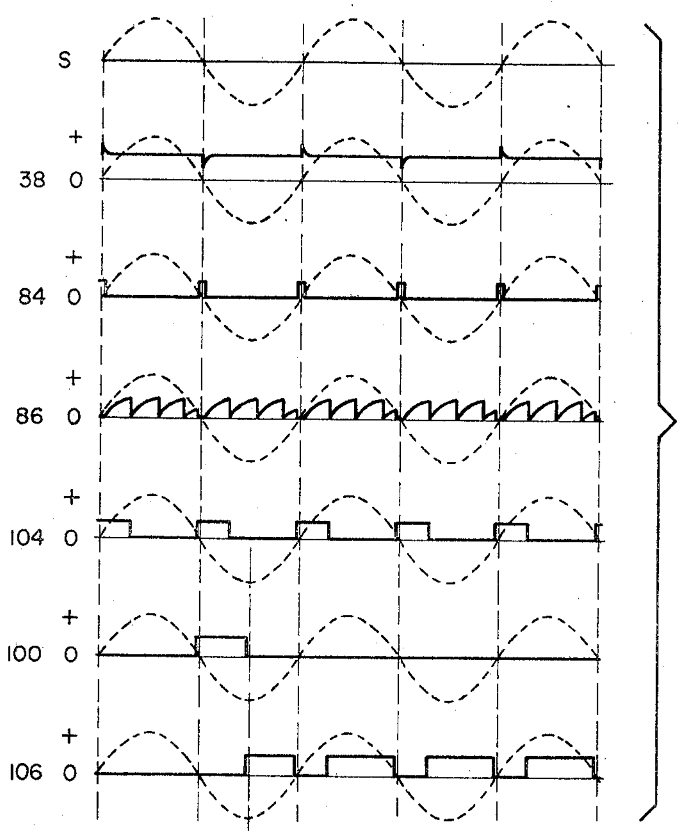
Figure 3:
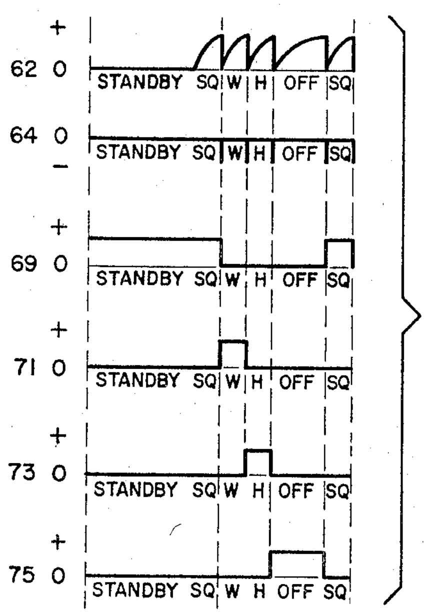

FIGS. 2 and 3 illustrate by curves with time as a reference, the signal voltages present at the points indicated in FIG. 1.

The circuits as shown in FIG. 1 of the drawings is particularly suited for controlling the sequence of operations and the flow of welding current in a resistance welding apparatus and includes a power supply, initiating and synchronizing section 10, a section 12 that controls the time and sequence of operations of the welding apparatus and a section 14 that supplies suitable output signals for controlling the intensity of welding current flow during the Weld interval as dictated by the section 12. To facilitate the understanding of the operation of the circuit shown in FIG. 1, certain well-known components, such as bias supplies for the transistors, transient filter circuits, and the like, have been omitted, the inclusion of which will be readily apparent to those skilled in the art to which this invention pertains. Additionally, the transistors shown are on the NPN type and, as in conventional practice, are provided with resistors in their base and collector circuits which are respectively designated as R1 and R2.

The power supply initiating and synchronizing section 10 includes a transformer 16, diodes D1–D7, capacitors C1 and C2, a transistor T1, an initiating switch SW1 having normally open switch contacts, an electronic switch device shown as a silicon controlled rectifier SCR, a relay SR having normally open contacts SR1 and SR2 in section 10 and normally closed contacts SR3, located in section 12, and a relay VR. The valve relay VR, when energized through a suitable apparatus, not shown, causes closure of the contacts of a pressure switch PS in section 12 and movement of a pair of electrodes 18 into engagement with a pair of metal parts 20 that are to be welded together. The transformer 16 has a primary winding 22 energized by a source of alternating current S, not shown, and a secondary winding 24 provided with a pair of output terminals 26 and 28 and a tap 30 intermediate the terminals 26 and 28. Connected to the tap 30 are leads C in the sections 10, 12 and 14, known as common or ground leads. The source S energizes the transformer 16 so that the secondary winding 24 provides an output voltage wave between the terminal 28 and the common lead C as illustrated by broken line curves in FIG. 2. The diodes D1 and D2 are respectively connected between the output terminals 26 and 28 to charge the capacitor C1 with a full wave rectified D.C. voltage through the lead 32, which voltage is maintained constant by the Zener diode D3 making the lead 32 positive in polarity relative to the common lead C. The transistor T1 has an emitter connected to the common lead C, a collector connected through a junction 34 and a collector resistor R2 to the lead 32 and a base connected to a junction 36. The junction 36 in turn is connected through the diode D7 to the common lead C and through a base resistor R1 for the transistor T1 to the output terminal 26. The diode D7 is connected to freely pass current from the common lead C to the junction 36 and block current in the reverse direction. The capacitor C2 has one side connected to the junction 34 and its other side connected to a junction 38 in section 12.

The diode D4, the relay SR and the switch SW1 are connected in series circuit between a lead 40 and the common lead C. The lead 40 is connected to the terminal 28. Similarly connected in series between the lead 40 and the common lead C are the diode D6, the valve relay VR, the contacts SR2 and the anode and cathode of the rectifier SCR. The diode D5 and the contacts SR1 are connected in series between a junction 42 located between the relay SR and the switch SW1 and a junction 44 located between the valve relay VR and the contacts SR2. The diodes D4 and D6 are connected to conduct current from the lead 40 to the common lead C and block current in the reverse direction. The diode D5 is connected to conduct current from the junction 42 to the junction 44 and block current flow in the reverse direction. The controlled rectifier SCR has a gate electrode connected via a lead 46 to a junction 50 located in the collector circuit of a transistor T13 in section 12.

The section 12 which controls the time and sequence of operations of the welding apparatus includes a unijunction type transistor T2, transistors T4–T13, diodes D8–D18, resistors R3–R10, adjustable resistors P1–P5, capacitors C3–C7, the pressure switch contacts PS, relay contacts SR3 and a switch SW2. Each of the transistors T4–T13 have an emitter connected to the common lead C and a collector connected through collector load resistor R2 to a lead 52 with an output terminal located between the collector and collector resistor R2. The lead 52 is connected through a lead 54 to the lead 32 to have a positive polarity potential relative to the common lead C. The lead 54 also supplies a lead 56 in the section 12 and a lead 58 in the section 14 with a positive polarity potential.

The switch contacts PS and a resistor R1 are connected in a series circuit between the lead 54 and the base of the transistor T4 which is also connected through a resistor R1 and a lead 60 to the collector of the transistor T7. The base of the transistor T5 is connected through a resistor R1 to the collector of the transistor T4 and through a resistor R1 to the lead 56. The collector of the transistor T5 is connected through the diode D8 to a junction 62. The diode D8 is connected to freely pass current from the junction 62 to the collector of the transistor T5 and block current flow in the reverse direction. The junction 62 is connected to one side of the capacitor C3 which has its other side connected through the resistor R4 to the common lead C. A junction 64 located between the capacitor C3 and the resistor R4 is connected to a lead 66. The junction 62 also is connected through the resistor R3 to a lead 68 and to the emitter electrode of the unijunction transistor T2. The unijunction transistor T2 has a base-one electrode directly connected to the common lead C and a base-two electrode connected to the junction 38 which in turn is connected through the resistor R9 to the slider of the adjustable resistor P5. The adjustable resistor P5 is connected across the leads 52 and the common lead C so the adjustable portion of the potential between the leads 52 and the common lead C will appear across the base-two and base-one electrodes of the unijunction transistor T2.

The transistor T6 has its collector connected to a junction 69 which is connected through a resistor R1 to the base of the transistor T7. The base of the transistor T6 is connected through individual circuits including leads 70, 72 and 74 and the base resistors R1 respectively to the collectors of the transistors T8, T10, and T12 at junctions 71, 73 and 75. The capacitors C4, C5, C6 and C7 each have one side connected to the lead 66 and another side connected through a suitable charging resistor to a collector of one of the transistors in section 12. Thus the capacitor C4 is connected through the resistor R5 to the collector of the transistor T7. Similarly, the capacitors C5 and C6 are respectively connected through the resistors R6 and R7 to the collectors of the transistors T9 and T11. The capacitor C7 is connected through the resistor R8 and the switch SW2, having normally closed contacts, to the collector of the transistor T13 and through the resistor R8 and a resistor R10 to the lead 52. Located between the capacitors C4, C5, C6, and C7 and their respective charging resistors R5, R6, R7 and R8 are junctions 76, 78, 80 and 82. The base of the transistor T8 is connected through the diode D13 to the junction 76. Similarly, the bases of the transistors T9 and T10 are respectively connected through the diodes D14 and D15 to the junction 78, the bases of transistors T11 and T12 are respectively connected through the diodes D16 and D17 to the junction 80 and the base electrode of the transistor T13 is connected through the diode D18 to the junction 82. The diodes D13–D18 each are connected to pass current from the bases of the transistors to the junctions to which they are connected and to block current flow in the reverse direction. Each of the transistors T6, T8, T10 and T12 has its collector connected through a diode and an adjustable resistor to the lead 68. That is, the collector of the transistor T6 is connected through the diode D9 and the resistor P1 to the lead 68. Similarly, the collectors of the transistors T8, T10 and T12 are respectively connected through the diodes D10, D11 and D12 and the respective resistors P2, P3 and P4 to the lead 68. The diodes D9–D12 are connected to pass current from the collectors of the transistors T6, T8, T10 and T12 to the lead 68 and block current flow in the reverse direction. The transistors T8–T9, T10–T11 and T12–T13 are connected as pairs to provide flip-flop circuits by having the base of each transistor in a pair connected to the collector of the associated transistor in the pair of transistors. For example, the base of the transistor T8 is connected through a resistor R1 to the collector of the transistor T9 while the base of the transistor T9 is connected through a resistor R1 to the collector of the transistor T8. Similarly, the bases of the transistors T10 and T12 are connected to the collectors of the transistors T11 and T13 while the bases of the transistors T11 and T13 are connected to the collectors of the transistors T10 and T12.

Additionally, a selected one of the transistors in each pair of transistors forming the flip-flop circuits has its base connected to lead 56 which is connected through the relay contacts SR3 to have a positive polarity impressed thereon whenever the contacts SR3 are closed. More specifically, the transistors T8, T10, and T12 each have their bases connected through a resistor R1 to the lead 56.

The section 14 that controls the intensity of welding current flow includes a unijunction transistor T3, transistors T14–T20, diodes D19–D21, capacitors C8 and C9, adjustable resistors P6 and P7 and a resistor R11. Each of the transistors T14–T20 has an emitter connected to the common lead C and a collector connected through a load resistor R2 to the lead 58, with an output terminal located between the collector and its associated load resistor R2. The transistor T14 has its base connected through a resistor R1 and the diodes D20 and D21 to the terminals 26 and 28 with the diodes D20 and D21 being connected to respectively conduct current from the terminals 26 and 28 to the base of the transistor T14 and block current flow in the reverse direction. The collector of the transistor T14 is connected through a junction 84 and a resistor R1 to the base of the transistor T15. The capacitor C8 has one side connected to the common lead C and another side connected through the adjustable resistor P6 to the lead 58. The diode D19 is connected between a junction 86 located in the circuit between the capacitor C8 and the resistor P6 and the collector of the transistor T15. The junction 86 additionally is directly connected to the emitter of the unijunction transistor T3 which has a base-two electrode connected to the lead 58 and a base-one electrode connected through the resistor R11 to the common lead C. The transistors T16 and T17 are connected as a pair to provide a flip-flop circuit with the transistor T16 having a base connected through a resistor R1 to the collector of the transistor T17 and the transistor T17 having a base connected through a resistor R1 to the collector of the transistor T16. Additionally, the base of the transistor T16 is connected through a resistor R1 to a junction 88 located between the base-one electrode of the unijunction transistor T3 and the resistor R11. The base of the transistor T17 is connected through a resistor R1 and a lead 90 to the junction 84. The transistors T18 and T19 are also connected as a pair to provide a flip-flop circuit with the transistor T18 having a base connected through a resistor R1 to the collector of the transistor T19 and the transistor T19 having a base connected through a resistor R1 to the collector of the transistor T18. The base of the transistor T18 is also connected through a resistor R1 and a lead 92 to the collector of the transistor T8 at the junction 71 in section 12. The base of the transistor 19 is connected through the adjustable resistor P7 to the lead 58 and through the capacitor C9 to collector of the transistor T18. The transistor T20 has a base connected to receive input signals from three sources by being connected through a resistor R1 and a lead 96 to the collector of the transistor T9 at a junction 98 in section 12, through a resistor R1 to the collector of the transistor 19 at a junction 100 and through a resistor R1 and a lead 102 to the collector of the transistor T16 at a junction 104. The collector of the transistor T20 is arranged to supply an output signal through a junction 106 and a lead 108 to a suitable control 110 which is energized by the source S and controls the flow of welding current through a primary winding 112 of a welding transformer 114 in response to a signal change at the junction 106. While the control 110 may be of any well-known type, an example of a control which may be used is disclosed in U.S. Patent No. 3,229,161, issued Jan. 11, 1966 on an application filed Mar. 25, 1963 and assigned by the inventor Ernest G. Anger to the assignee of the present invention.

The operation of the circuitry shown in FIG. 1 is as follows, reference being had to the curves shown in FIGS. 2 and 3 wherein the numerically designated curves illustrate the potential at similarly designated junctions shown in FIG. 1 with time as a reference. In FIG. 2 the broken line curves illustrate the voltage wave between the terminal 28 and the common lead C.

During standby conditions, the transformer 16, as energized by the source S, provides an output at the terminals 26 and 28 which is rectified by the diodes D1 and D2 to cause the leads 32, 52 and 58 to have a positive polarity relative to the common lead C in the sections 10, 12 and 14. The switch contacts SW1 are open and the section 10 operates as follows. The relay SR is de-energized, causing the contacts SR1 and SR2 to be open and the contacts SR3 to be closed. The contacts SR2 cause the valve relay to be de-energized which in turn operates a suitable apparatus, not shown, which causes the electrodes 18 to be separated from the work pieces 20 and the switch contacts PS to be open. Although the gate electrode of the rectifier SCR is receiving a positive polarity firing signal from the junction 50, the rectifier SCR is non-conductive as its anode circuit is opened by the contacts SR2. The transistor T1 is switched synchronously with the polarity reversals of the source S to a conductive state during each half cycle of positive polarity at the terminal 26 and to a non-conductive state when the terminal 26 is negative in polarity relative to the common lead C. The junction 34 follows the changes in conduction of the transistor T1 and causes the capacitor C2 to be charged with polarities which reverse with the changes in the conductive state of the transistor T1 to thereby cause alternate polarity voltage spikes to appear at the junction 38 at each instant of reversal in polarity at the terminal 28 as shown in the curve 38 in FIG. 2. The transistors T4–T20 in sections 12 and 14 are connected to operate as positive polarity NOR logic units and are switched to a conductive state when a positive polarity signal is impressed on any input connected to its base and to a non-conductive state when all of the inputs to its base have a potential substantially equal to the common lead C. The output of the NOR unit is taken at a junction or terminal located between the collector and the collector load resistor. Thus when the transistor in a NOR unit is conducting, the potential at the output of the NOR unit will be substantially the same as the common lead C and when the transistor of a NOR unit is non-conducting, the output will be substantially equal to the positive polarity supply for the NOR unit.

For purposes of description, a designation of a logic "0" will be assigned to a signal having a potential substantially equal to the potential of the common lead C and a "1" will designate a signal having a positive relative to the common lead C. During standby conditions the relay contacts SR3 are closed causing the lead 56 to be energized and supply a "1" signal to the bases of the transistors T5, T8, T10 and T12. The transistor T5 conducts in response to the "1" signal at its base and maintains a discharge circuit for the capacitor C3 through the diode D8. The transistors T8, T10, and T12 are respectively paired with the transistors T9, T11 and T13 as flip-flop circuits in a ring counter and the "1" input signal to the bases of the transistors T8, T10 and T12 causes the collectors of the transistors T8, T10, T12 to have a "0" signal at junctions 71, 73 and 75 and a "1" signal at the collectors of the transistors T9, T11 and T13 at the junctions 98, 99 and 50.

The "0" signal at junctions 71, 73 and 75 as impressed on the base of the transistor T6 via the leads 70, 72 and 74, causes the transistor T6 to have a "1" output signal at the junction 69 and the transistor T7 to have a "0" output signal. The "0" signal output of the transistor T7 is transferred via the lead 60 to the base of the transistor T4 which also receives a "0" signal when the contacts PS are open so that the transistor T4 supplies a "1" output signal to the base of the transistor T5.

During standby conditions the section 14 operates as follows. The base of the transistor T14 is connected through the diodes D20 and D21 to the terminals 26 and 28. Thus the transistor T14 is biased to full conduction during a major portion of each half cycle of the alternating current source S and is briefly switched to a non-conductive state when the polarity of the alternating voltages wave of the source S reverses. The transistor T14 thus supplies a "0" signal which momentarily switches to a "1" signal at the junction 84 at the instants the polarity of the source S voltage reverses, as shown by the curve 84 in FIG. 2. The signal at the junction 84 acts as a synchronizing signal to synchronize the operation of the section 14 with the source S and is impressed on the base of the transistor T15 which responds to each momentary "1" signal at the junction 84 and by switching to a conductive state and discharging the capacitor C8 through the diode D19. Thus the capacitor C8 is discharged at the beginning of each half cycle of alternating polarity of the source S. During the intervals during each half cycle when the transistor T15 is non-conducting, the capacitor C8 is charged through the adjustable resistor P6. After a predetermined time interval during each half cycle, as determined by the adjustment of the slider of the adjustable resistor P6, the charge on the capacitor C8, as impressed across the emitter to base-one electrode of the unijunction transistor T3, exceeds the intrinsic standoff ratio of the transistor T3 and the transistor T3 switches to a conductive state and discharges the capacitor C8 and causes a momentary "1" signal to appear at the junction 88 at the instants the signal at the junction 86 become "0" as shown by the curve 86 in FIG. 2. As previously stated, at the beginning of each half cycle of the alternating polarity of source S, the signal at the junction 84 becomes a momentary "1" as shown by the curve 84 in FIG. 2. The momentary "1" signal at the junction 84 is also transmitted via the lead 90 to the base of the transistor T17 which is connected with the transistor T16 to act as a flip-flop multivibrator, as will now be explained. The momentary "1" signal at the junction 84 causes the transistor T17 to switch to a conductive state and supply a "0" signal to the base of the transistor T16 at the same instant the transistor T16 receives a "0" signal from the junction 88 because the "1" signal at the junction 84 which caused the switching of the transistor T17 also causes the transistor T15 to switch to a conductive state and discharge the capacitor C8. Thus at the beginning of each half-cycle of alternating polarity source S, the transistor T16 switches to a non-conductive state and causes a "1" signal to appear at the junction 104, as shown by the curve 104 in FIG. 2. Subsequently during each half cycle, as determined by the charging rate of the capacitor C8, the signal at the junction 88 switches to a momentary "1" and the transistor T16 conducts to cause a "0" signal to appear at the junction 104, which is maintained during the remainder of the half cycle because of the flip-flop connections between the transistors T16 and T17.

The operation of the transistors T18 and T19 which are connected as a flip-flop to act as a one-shot multivibrator, is as follows. During all timing periods except the Weld period, as will be later explained, the lead 92 supplies the base of the transistor T18 with a "0" signal causing a "1" signal to appear at its collector. The "1" signal from the transistor T18 is supplied as an input to the base of the transistor T19 and the transistor T19 conducts, causing a "0" signal to be present at the junction 100 and the capacitor C9 to be charged in a direction making the side of the capacitor C9 that is connected to the collector of the transistor T18 positive in polarity relative to the side of the capacitor which is connected to the base of the transistor T19. The Weld period begins when the signal at the junction 71 switches from "0" to "1." The "1" signal at the junction 71, as transmitted via the lead 92 to the base of the transistor T18, causes the transistor T18 to switch to a conductive state and a "0" signal to appear at its collector. The switching to a conductive state of the transistor T18 causes the charge on the capacitor C9 to be impressed across the emitter to base of the transistor T19 in a direction making the base negative relative to the emitter and the transistor T19 switches to a non-conductive state and causes a "1" signal to appear at the junction 100, as shown by the curve 100 in FIG. 2. The initial charge on the capacitor C9 is dissipated as the capacitor C9 discharges through the R1 resistor in the base circuit of the transistor T19 and the circuit through the supply which includes the adjustable resistor P7. After a predetermined time interval, as determined by the adjustment of the resistor P7, which occurs preferably 85° during the half cycle of the source S after the transistor T18 switched to a conductive state, the charge on the capacitor C9 is reversed and rises to a value sufficient to switch the transistor T19 to a conductive state so the signal at the junction 100 becomes "0" and remains "0" throughout the remainder of the Weld interval as is shown by the curve 100 in FIG. 2.

The base of the transistor T20 receives signals from three separate sources. That is, it receives a "1" signal from the junction 98 throughout all periods except during the Weld period when the signal at the junction 98 becomes "0." Thus during all timing periods except the Weld period, the "1" signal from the junction 98 prevents the transistor T20 from switching to a non-conductive state. At the beginning of the Weld period the signal supplied to the base of the transistor T20 from the junction 98 becomes "0" and the conductive state of the transistor T20 is controlled by the signal at the junctions 104 and 100. Also at the beginning of the Weld period, the change to a "1" signal at the junction 71 switches the transistor T18 to initiate the discharging of the capacitor C9 through the adjustable resistor P7. As previously described, the charge on the capacitor C9 switches the transistor T19 to a non-conductive state and the resistor P7 limits the rate of reversal of the capacitor C9 to a value which prevents the transistor T19 from switching from a non-conductive state during the first ¼ cycle of the voltage wave of the source at the beginning of the Weld period. The transistors T18 and T19 thus act as a one-shot multivibrator and provide a function commonly known as delayed firing for the circuit by preventing the switching of the transistor T20 earlier than 85° to 90° during the first half cycle of the Weld period to prevent excessive flow of welding current through the hypersil welding transformer, as is well known to those skilled in the art.

Additionally, the base of the transistor T20 is connected to receive an input signal from the junction 104. As previously explained, at the beginning of each half cycle of the alternating polarity source S, the transistor T16 causes a "1" signal to appear at the junction 104 which subsequently becomes "0" during each half cycle as determined by the charging rate of the capacitor C8.

Thus when the Weld period begins, which preferably occurs at the beginning of an L2 half cycle when the polarity of the junction 26 goes positive, and the signal at the junction 98 goes to "0," the transistor T20 will be prevented from switching to a conductive state prior to 85° to 90° during the first half cycle of L2 polarity of the source S by the "1" signal at the junction 100 which switches to a continuous "0" throughout the remainder of the Weld period because of the one-shot multi-vibrator characteristics of the circuit including the transistors T18 and T19. After 85° to 90° during the first half cycle and during the remaining half cycles of the Weld period, the switching of transistor T20 is exclusively controlled by the signal changes at the junction 104 which switches to "1" at the beginning of each half cycle and to "0" at an adjustable instant subsequently during each half cycle to provide a heat control function for the welding apparatus.

The sequence of operations is initiated by closing the contacts of the switch SW1 and completing an energizing circuit for the operating coil of the relay SR through the diode D4. The relay SR, when energized, closes the contacts SR1 and SR2 and opens the contacts SR3. The signal at the junction 50, which is "1" during all timing periods except during the Off period, is supplied to the gate electrode of the controlled rectifier SCR. Thus when the contacts SR2 close, the energizing circuit for the valve relay is completed through the diode D6, the energized coil VR, the junction 44, the closed contacts SR2 and the conducting rectifier SCR. Additionally, the closed contacts SR1 and SR2 complete a holding circuit for the relay SR through the diode D5, the contacts SR1, the junction 44, the contacts SR2 and the conducting rectifier SCR, permitting the opening of the initiating switch SW1 after the relay SR is energized.

The valve relay VR, when energized, causes movement of the welding electrodes 18 into engagement with the work pieces 20 and the closure of the pressure switch PS which occurs subsequent to the opening of the contacts SR3 which de-energized the lead 56 and removes the "1" signal from the bases of the transistors T5, T8, T10 and T12. The transistors T5, T8, T10 and T12 however do not switch to a non-conductive state when the contacts SR3 open because the transistors T4, T9, T11 and T13 respectively continue to supply "1" signals to their respective bases. A continuous "1" signal is supplied to the base of the transistor T4 when the switch contacts PS close to begin the Squeeze period and the transistor T4 switches to a conductive state and supplies a "0" signal to the base of the transistor T5. The transistor T5 in response to the "0" input signal on its base becomes non-conductive and interrupts the discharge circuit for the capacitor C3. The transistors T8–213 are interconnected as pairs to form flip-flops of a ring counter and when the switch SW1 is initially closed have been previously reset by the closed contacts SR3 so the signals at the junctions 71, 73 and 75 are each "0," indicating that the control is not in a Weld, Hold or an Off period. Thus if the control is not in any one of the three periods it must be operating in the Squeeze period. This result is achieved by impressing the "0" signals at the junctions 71, 73 and 75 on the base of the transistor T6 which acts as a logic decoding element in the circuit and in response to the "0" signals is non-conductive and causes a "1" signal to appear at the junction 69. The "1" signal at the junction 69 is used to charge the capacitor C3 during the Squeeze period at a rate determined by the adjustment of the resistor P1. The charging current for the capacitor C3 flows through a circuit which includes the junction 69, the diode D9, the resistor P1, the lead 68, the resistor R3, the junction 62 and the capacitor C3 in a direction to gradually increase the positive potential at the junction 62. The junction 62 is directly connected to the emitter electrode of the unijunction transistor T2 which has its base-two and base-one electrodes connected between the junction 38 and the common lead C. At the beginning of each L2 half cycle of the source S, when the transistor T1 switches from a nonconductive to a conductive state, a sharp negative voltage spike is delivered to the junction 38, as shown by the curve 38 in FIG. 2. The negative voltage spike at the junction 38 decreases the base-one to base-two potential and the emitter to base-one electrode potential required to switch the unijunction transistor T2. Thus the unijunction transistor T2 conducts when the charge across the capacitor C3 is sufficient to exceed the required momentarily reduced emitter to base-one electrode potential of the unijunction transistor T2. As the momentary negative voltage spike at the junction 38 occurs at the beginning of each L2 half cycle of the source S, the switching to a conductive state of the unijuction transistor T2 is synchronized with the reversals in polarity to an L2 half cycle of the source S at the beginning of each Squeeze, Weld, Hold or Off period of the sequence of operation of the circuit. The switching to a conductive state of the unijunction transistor T2 discharges the capacitor C3 at the end of the Squeeze period and causes a negative voltage spike to appear at the junction 64, as shown on the curve 64 in FIG. 3, which is transmitted to the lead 66.

As previously stated, during standby conditions and during the Squeeze period the tranistor T7 is conducting and the transistors T9, T11 and T13 are non-conducting. The capacitor C4 is discharged as the collector of the transistor T7 has a "0" signal while the capacitors C5, C6 and C7 are charged, making the junctions 78, 80 and 82 positive in polarity because of the "1" signals appearing at the collectors of the transistors T9, T11 and T13. The Squeeze period ends when the momentary negative polarity pulse appears at the junction 64. The negative polarity pulse, as transmitted by the lead 66 to the capacitors C4, C5, C6 and C7, momentarity drives the polarities at the junctions 76, 78, 80 and 82 in a negative direction. As the capacitors C5, C6, and C7 are charged in a direction making the junctions 78, 80 and 82 positive in polarity, the negative pulse merely momentarily reduces the positive potential at the junctions 78, 80 and 82 without changing the conductive states of the transistors T10 and T12. The capacitor C4, however, is not charged and the negative polarity pulse at the junction 64, which causes the potential at the junction 76 to become negative, is impressed on the base of the transistor T8. The transistor T8 thereby switches to a non-conductive state to begin the Weld period and causes a "1" signal to appear at the junction 71 as shown by the curve 71 in FIG. 3. The "1" signal at the junction 71 accomplishes three functions, as it switches the transistor T9 to a conductive state so a "0" signal appears at its collector, it switches the transistor T6 so a "0" signal appears at the junction 69 as shown by the curve 69 in FIG. 3, and it additionally provides a charging potential for the capacitor C3. The "0" signal at the junction 69 causes the transistor T7 to switch to a non-conductive state and a "1" signal to appear at its collector. The "1" signal at the collector of the transistor T7 causes the capacitor C4 to charge in a direction making the junction 76 positive in polarity. The "1" signal at the collector of T7 is also impressed on the base of the transistor T4 through the lead 60 assuring continued conduction of the transistor T4, even if the switch contacts PS should momentarily open. Thus the ring counter is conditioned to have the junctions 98, 73 and 75 have a "0" signal and the junction 71 a "1" signal causing the circuit to operate in the Weld period as the signal at the junction 98 switches to a "0." Throughout the Weld period the conduction of the transistor T20 is controlled by the signals appearing at the junctions 104 and 100, as previously described.

During the Weld period the capacitor C3 is charged by the positive potential at the junction 71 through a circuit including the diode D10, the adjustable resistor P2, the lead 68, the resistor R3 and the junction 62 at a rate determined by the resistance value of the resistor P2. The charge across the capacitor C3 gradually increases the positive potential at the junction 62 to a value which causes the unijunction transistor T2 to conduct and supply a negative polarity pulse at the junction 64, as shown on the curve 64 in FIG. 3, to terminate the Weld period in the same manner as the potentials at the junctions 62 and 38 caused the negative polarity pulse at the junction 64 to terminate the Squeeze period. The pulse appearing at the junction 38 which reduced the interbase potential across the unijunction transistor T2 occurs at the end of an L1 polarity half cycle and at the beginning of an L2 polarity half cycle. The charging rate of the capacitor C3 and the magnitude of the negative polarity pulse at the junction 38 are selected so that the unijunction transistor T2 will switch to a conductive state only when the capacitor C3 is sufficiently charged and a negative pulse appears at the junction 38. Thus the Weld period will be terminated at the end of an L1 half cycle and the Hold period will begin at the beginning of an L2 half cycle and, as the Weld period was initiated at the beginning of an L2 half cycle and terminated at the end of a L1 half cycle, full cycle welding current flow is assured to prevent saturation of the welding current transformer.

During the Weld period the charge on the capacitor C5 dissipates through a circuit including the junction 78, the resistor R6, the junction 98, the conducting transistor T9, the common lead C, the resistor R4, the junction 64 and the lead 66. Also during the Weld period the capacitor is charged by the "1" signal at collector of the transistor T7 through the resistor R5. Thus at the end of the Weld period the capacitor C5 is discharged and the capacitors C4, C6 and C7 are charged. When a negative polarity pulse at the junction 64, as shown by the curve 64 in FIG. 3, terminates the Weld period, the conductive state of the transistors T12 and T13 remain unchanged because of the charged capacitors C4, C6 and C7. However, as the capacitor C5 is discharged, the negative pulse at the junction 64, which appears at the junction 78, causes the bases of the transistors T9 and T10 to become momentarily negative and the transistors T9 and T10 to be non-conductive. The switching to a non-conductive state of the transistors T9 and T10 which begins the Hold period causes the transistors T8 and T11 to switch to a conductive state so that the junctions 98 and 73 have a "1" output signal and the junction 71 and the collector of transistor T11 have a "0" output signal during the Hold period. The "1" signal at the junction 98, as applied to the base of the transistor T20, terminates the welding current flow. The "1" signal at the junction 73 causes the capacitor C3 to charge through a circuit including the diode D11, the adjustable resistor P3, the lead 68, the resistor R3 and the junction 62 at a rate determined by the resistance value of the resistor P3. The charge across the capacitor C3 gradually increases the positive potential at the junction 62 to a value which causes the unijunction transistor T2 to conduct and supply a negative polarity pulse at the junction 64, as shown on the curve 64 in FIG. 3, to terminate the Hold period in the same manner as the potentials at the junctions 62 and 38 caused the negative polarity pulse at the junction 64 to terminate the Squeeze period.

During the Hold period, the charge on the capacitor C6 is dissipated through a circuit including the junction 80, the resistor R7, the conducting transistor T11, the common lead C, the resistor R4, the junction 64 and the lead 66. Also during the Hold period the capacitor C5 is charged by the "1" signal at junction 98 through the resistor R6. Thus at the end of the Hold period the capacitor C6 is discharged and the capacitors C4, C5 and C7 are charged. When a negative polarity pulse at the junction 64, as shown by the curve 64 in FIG. 3, terminates the Hold period, the conductive state of the transistors T8 and T9 remains unchanged because of the charged capacitors C4 and C5. However, as the capacitor C6 is discharged, the negative pulse at the junction 64, which appears at the junction 80, causes the bases of the transistors T11 and T12 to become momentarily negative and the transistors T11 and T12 to be non-conductive. The switching to a non-conductive state of the transistors T11 and T12, which begins the Off period, causes the transistors T10 and T13 to switch to a conductive state so that the junctions 73 and 50 have a "0" output signal and the junction 75 and the collector of transistor T11 have a "1" output signal during the Off period. The "0" signal at the junction 50, supplied to the gate of the rectifier SCR, causes the rectifier SCR to become non-conductive and the valve relay VR to be de-energized. The de-energized valve relay VR causes the electrodes 18 to separate from the work pieces 20 and the pressure switch contacts PS to open. The opening of the switch contacts PS removes one of the "1" signals to the base of the transistor T4 which also receives a "1" input signal from the collector of the transistor T7 so the transistor T4 continues in a conductive state when the switch contacts PS open. The "1" signal at the junction 75 causes the capacitor C3 to charge through a circuit including the diode D12, the adjustable resistor P4, the lead 68, the resistor R3 and the junction 62 at a rate determined by the resistance value of the resistor P4. The charge across the capacitor C3 gradually increases the positive potential at the junction 62 to a value which causes the unijunction transistor T2 to conduct and supply a negative polarity pulse at the junction 64, as shown on the curve 64 in FIG. 3, to terminate the Off period in the same manner as the potentials at the junctions 62 and 38 caused the negative polarity pulse at the junction 64 to terminate the Squeeze period.

During the Off period of the switch SW2 is closed for repeat operation of the circuit, the charge on the capacitor C7 is dissipated through a circuit including the junction 82, the resistor R8, the switch SW2, the conducting transistor T13, the common lead C, the resistor R4, the junction 64 and the lead 66. Also during the Off period the capacitor C6 is charged by the "1" signal at collector of the transistor T11 through the resistor R7. Thus at the end of the Off period the capacitor C7 is discharged and the capacitors C4, C5, and C6 are charged. When the negative polarity pulse at the junction 64, as shown by the curve 64 in FIG. 3, terminates the Off period, the conductive state of the transistors T8, T9, T10 and T11 remains unchanged because of the charged capacitors C4, C5 and C6. However, as the capacitor C7 is discharged, the negative pulse at the junction 64, which appears at the junction 82 causes the base of the transistor T13 to become momentarily negative and the transistor T13 to be non-conductive. The switching to a non-conductive state of the transistor T13, which ends the Off period, causes the transistor T12 to switch to a conductive state so that the junction 75 has a "0" output signal and the junction 50 has a "1" output signal. During the Weld, Hold and Off periods at least one of the junctions 71, 73 and 75 has a "1" signal and the decoding transistor T6 is maintained conductive. At the end of the Off period the signal at each of the junctions 71, 73 and 75 is "0," indicating the control is not in a Weld, Hold or an Off period and the transistor T6 switches to a non-conductive state so a "1" signal appears at the junction 69 which switches the transistor T7 to a conductive state so a "0" signal appears at its collector. The "0" signal at the collector of the transistor T7 discharges the capacitor C4 and also is transmitted through the lead 60 to the base of the transistor T4. During the Off period the switch contacts PS are open. Thus at the end of the Off period the transistor T4 switches to a non-conductive state, supplying a "1" signal to the base of the transistor T5 which switches to a conductive state and discharges the capacitor C3. If the switch SW1 is open at the end of the Off period, the relays SR and VR will be de-energized and the contacts SR3 wil be closed and the section 12 will be returned to the standby condition as described. If at the end of the Off period the switch SW1 should be closed, then the relay SR will be energized and the control will begin a Squeeze period and will operate to provide a sequence of operations as described.

The switch SW2, when opened, prevents the circuit from repeating its sequence of operations. In the event the switch SW2 is open and the switch SW1 is closed at the end of an Off period, the discharge circuit for the capacitor C7 through the conducting transistor T13 is interrupted and the charge on the capacitor C7 is maintained. Thus a negative pulse at the junction 64 will not switch the transistor T13 to a non-conductive state and the circuit is maintained in an Off period state with the relay SR energized and the valve relay de-energized as long as the switch SW1 is held closed. The circuit is restored from an Off period state to a standby state when the switch SW1 is opened to de-energize the relay SR. When the relay SR is de-energized, the contacts SR3 close and a "1" signal is applied through the lead 56 to the base of the transistor T12 which switches the flip-flop including the transistor T12 and T13 so as a "1" signal appears at the juncture 50 and a "0" signal at the junction 75.

While the system herein described is arranged to sequence and time the duration of four periods of operation of a welding apparatus, it is manifest that additional periods of operation may both be sequenced and timed by including additional flip-flops in the ring counter and supplying output signals from the additional flip-flops to the decoding logic element and timing capacitor C3 and supplying an input signal to the additional flip-flops for switching the flip-flops when the charge on the capacitor C3 has reached a predetermined value.

While certain preferred embodiments of the invention have been specifically disclosed, it is understood that the invention is not limited thereto, as many variations will be readily apparent to those skilled in the art.

What is claimed is:

1. A control circuit for sequencing and timing X number of operations of a resistance welding apparatus comprising:

(a) timing means including a single capacitor and a terminal providing an output signal synchronized with reversals in polarity of an alternating voltage source when a charge on the capacitor exceeds a predetermined value, (b) a ring counter including $X-1$ number of bistable-state switchable flip-flops each having a pair of inputs for selectively switching the flip-flop from one bistable state to the other of said bistable states and providing an output signal when the flip-flop is in a selected one of the bistable states, (c) a logic decoding element having an input connected to the output terminal of each flip-flop and an output terminal providing an output signal when all of the flip-flops are in a state other than the selected state, and (d) X number of adjustable resistors each individually connecting one of the output terminals of the flip-flops and the output terminal of the decoding element in a charging path with the capacitor for charging the capacitor when an output signal is present at any one of the output terminals of the flip-flops and the decoding element.

2. A control circuit for a resistance welder, comprising:

(a) timing means including a timing capacitor and a terminal providing an output signal synchronized with reversals in polarity of an alternating voltage source for the circuit whenever a charge on the capacitor exeeds a predetermined value, (b) a ring counter including a plurality of bistable-state switchable flip-flops each having a pair of inputs for selectively switching the flip-flop from one bistable state to the other of said bistable states and an output terminal providing an output signal when the flip-flop is in a selected one of the bistable states, (c) a NOR logic decoding element having an input connected to the output terminal of each flip-flop and an output terminal providing an output signal when all of the flip-flops are in a state other than the selected state, (d) a plurality of adjustable resistors equal in number to the number of output terminals provided by the flip-flops and the decoding element with each resistor individually connecting one of the output terminals of the flip-flops and the decoding element in a charging path with the capacitor for charging the capacitor when an output signal is present at any of the output terminals, and (e) means responsive to the output signal from the timing means connected to selected inputs to the flip-flops for selectively switching the flip-flops in a predetermined sequence so only one of said flip-flops provides an output signal in response to an output signal from the timing means.

3. The combination as recited in claim 2 including means having an input response to the output signal from a selected one of the flip-flops in the ring counter for delaying initiation of welding current flow for a predetermined time interval after the selected flip-flop has switched to provide the output signal and for controlling the intensity of the welding current flow after the welding current flow is initiated.

4. The combination as recited in claim 3 wherein the means for controlling the initiation and intensity of welding current flow includes a flip-flop having an input response to the output signal from the selected flip-flop in the ring counter for providing an output signal change a predetermined time interval after the selected flip-flop has switched to provide the output signal.

5. The combination as recited in claim 3 wherein the means for controlling the intensity of welding current flow includes a bistable state switchable flip-flop having a first input for switching the flip-flop to one of said bistable states in response to an input signal and a second input for switching the flip-flop to a second of said bistable states in response to an input signal, means providing an input signal to the first input in synchronism with reversals in polarity of an alternating voltage source for the system, and means providing an input signal to the second input an adjustable instant subsequent to each reversal in polarity of the source.

6. The combination as recited in claim 2 including a relay for controlling the operation of a welding apparatus, and an electronic switch having an anode and cathode connected in a series circuit with an operating coil of the relay and a control electrode connected to the output terminal of a selected one of the flip-flops in the ring counter for supplying a signal for switching the electronic switch to a conductive state when the selected one flip-flop is in the selected one of its bistable states.

7. The combination as recited in claim 2 including delayed firing means having an input response to the output signal from a selected one of the flip-flops in the ring counter for delaying initiation of welding current flow for a predetermined time interval after the selected flip-flop has switched to its selected one of its bistable states, heat control means providing an output signal an adjustable instant subsequent to each reversal in polarity of the alternating voltage source, and means having input receiving output signals from the relayed firing means, the heat control means and the selected flip-flops for initiating welding current flow a predetermined time interval after the selected flip-flop has switched to its selected bistable state and for initiating welding current flow an adjustable instant after each reversal in polarity of the source when the selected one flip-flop is in the selected bistable state.

8. The combination as recited in claim 2 wherein the decoding element includes a transistor having a base electrode connected to the output terminals of each of the flip-flops in the ring counter.

9. The combination as recited in claim 2 including a switch having normally closed contacts connected between a signal source and a selected one of the pair of inputs of each flip-flop in the ring counter for switching the flip-flops to a state other than the selected one bistable state.

10. The combination as recited in claim 2 wherein the timing means includes a unijunction transistor and a means for reducing a voltage between the bases of the unijunction transistor at each instant the polarity of the source reverses.

References Cited

UNITED STATES PATENTS

| | | | |
|---|---|---|---|
| 2,968,760 | 1/1961 | Cater | 219—108 X |
| 3,185,819 | 5/1965 | Greiner | 307—223 X |
| 3,251,000 | 5/1966 | Suel | 328—75 X |
| 3,264,517 | 8/1966 | Ullman et al. | 219—108 X |
| 3,404,251 | 10/1968 | Hubbard | 219—108 |

ROBERT K. SCHAEFER, Primary Examiner

T. B. JOIKE, Assistant Examiner

U.S. Cl. X.R.

219—108; 307—269; 328—72

PO-1050
(5/69)

UNITED STATES PATENT OFFICE
CERTIFICATE OF CORRECTION

Patent No. 3,484,620 Dated December 16, 1969

Inventor(s) Marvin A. Guettel

It is certified that error appears in the above-identified patent and that said Letters Patent are hereby corrected as shown below:

Col. 1, line 29, cancel "circuit" and insert --circuits--.
Col. 3, line 14, cancel "on" and insert --of--.
Col. 9, line 27, cancel "energized" and insert --energizing--; line 52, cancel "213" and insert --T13--.
Col.10, line 18, cancel "or" and insert --and--; line 35, cancel "momentarity" and insert --momentarily--.
Col. 11, line 29, after "capacitor" insert --C4--.
Col. 12, line 34, cancel "of" and insert --if--; line 75, cancel "wil" and insert --will--.
Col. 13, line 22, cancel "transistor" and insert --transistors-- same line, cancel "as".
Col. 14, lines 23 and 59, each occurrence, cancel "response" and insert --responsive--; line 67, cancel "relayed" and insert --delayed--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,484,620 Dated December 16, 1969

Inventor(s) Marvin A. Guettel

It is certified that error appears in the above-identified patent and that said Letters Patent are hereby corrected as shown below:

Column 14, line 17, "to", second occurrence, should read -- of --.

Signed and sealed this 11th day of August 1970.

(SEAL)
Attest:

EDWARD M.FLETCHER,JR.
Attesting Officer

WILLIAM E. SCHUYLER, JR.
Commissioner of Patents